March 4, 1952  E. M. MAGNUSSON  2,588,023
BOOKKEEPING MACHINE
Filed Nov. 5, 1948　9 Sheets-Sheet 1

INVENTOR
Elis M. Magnusson
By Darby & Darby
ATTORNEYS

March 4, 1952 E. M. MAGNUSSON 2,588,023
BOOKKEEPING MACHINE
Filed Nov. 5, 1948 9 Sheets-Sheet 3

INVENTOR
Elis M. Magnusson
By Darby & Darby
ATTORNEYS

INVENTOR
Elis M. Magnusson
By Darby & Darby
ATTORNEYS

INVENTOR
Elis M. Magnusson
By Darby & Darby
ATTORNEYS

March 4, 1952 — E. M. MAGNUSSON — 2,588,023
BOOKKEEPING MACHINE
Filed Nov. 5, 1948 — 9 Sheets-Sheet 9

INVENTOR
Elis. M. Magnusson
By Darby & Darby
ATTORNEYS

Patented Mar. 4, 1952

2,588,023

UNITED STATES PATENT OFFICE 2,588,023

BOOKKEEPING MACHINE

Elis Magnus Magnusson, Stockholm, Sweden, assignor to Aktiebolaget Ekonomiregister, Stockholm, Sweden, a corporation of Sweden Application November 5, 1948, Serial No. 58,446

19 Claims. (Cl. 235—61.9)

The present invention relates to machines for book-keeping, statistical and similar purposes comprising a number of totalizers, in which a selector mechanism selects those two or more totalizers, which correspond to a certain calculating operation or business transaction and in balancing totalizers determines the sense of calculation or registration (addition or subtraction).

The present invention refers in part to the machines described in the application Serial No. 764,740, filed July 30, 1947, and in the U. S. Patent Specification No. 2,277,250. Said application Serial No. 764,740 concerns improvements in the subject matter of said U. S. Patent Specification No. 2,277,250, i. e. a device, in which selector means corresponding each to a fixed combination of totalizers are operated by keys, said keys and said selector means being interdependent in such a manner, that the selector means operated is determined by a combination of two of a number of keys corresponding each to one of the possible changes of the financial or like factors, each of said combination of keys corresponding to one of the possible types of business transactions to be registered. In other words while the operator of the machine according to Patent Specification No. 2,277,250 had to analyze the business transaction to be recorded and to determine which combination of changes of financial or like factors said transaction represented, and to actuate an analysing key corresponding to said combination, the operator of the machine according to application Serial No. 764,740 had only to depress two keys corresponding to the changes in business factors, said keys in combination selecting automatically the operating member corresponding to the type of transaction to be registered, said operating member automatically setting the desired totalizers and/or printing mechanisms in position to be actioned in the desired sense when performing the registering operation.

Application Serial No. 764,740 also describes how the selection of the correct keys, provided for each of the possible combinations of transactions is facilitated by indication on the account cards, or other form used in the registration of the transaction a number or other mark corresponding to the key or keys to be depressed.

The present invention has for its object a practical device for the wholly automatical selection of the releasing bars dependently of the account-card, voucher or other form inserted into the machine for performing the registration of the transaction, thus totally cutting out the thought act of the operator necessary for analysing the business transaction or reading indications on the account cards.

Another object of the invention is to provide appropriate means on the account cards or the like and contact means on the machine cooperating with said account cards or the like for the actuation of electromagnets, which in combination with each other select the selecting member or members to be operated.

Another object of the invention is to provide appropriate means for connecting the electromagnet selected to a source of electric current either directly through the contact means cooperating with the account cards or the like or by relaying means governed by said contact means.

U. S. Patent Specification No. 2,277,250 as well as application Ser. No. 764,740 describe machines, having eight releasing bars (as 50) corresponding each to one of the eight fundamental types of transactions, which can be recorded. In Patent Specification 2,277,250 each of said bars is actuated by a special selecting key corresponding directly to the transaction type, while said bars according to application Ser. No. 764,740 are selected each by a combination of two keys of a series of eight keys each corresponding to one of the financial factors determining the business transaction. In both cases it has been necessary for correcting purposes to provide a second row of eight releasing bars corresponding to those combinations of financial factors, which are the reverse of the eight fundamental types of business transactions.

To permit the wholly automatic selection of releasing bars dependently of the account cards or the like set into the machine and of the place of the machine in which said cards are inserted (debit side or credit side), the invention has also for its object to provide a machine in which all the sixteen possible combinations of increases and decreases of assets, liabilities, profits and losses correspond each to one releasing bar automatically selected by the account card, voucher or the like inserted into the machine.

A further object of the present invention is a development of the selecting means for the eight releasing bars described in the patent application Serial No. 764,740 adapted to permit the selection of one of the aforesaid sixteen possible combinations of financial factors corresponding to sixteen releasing bars placed in one single row.

A further purpose of the present invention is to permit the fully automatical selection of the releasing bar corresponding to the business transaction to be registered in a machine, in which debit account cards and credit account cards on which the transaction is to be recorded are to be inserted each in one of two printing devices, by means of said account cards, each card inserted maintaining its part of the combination of types of financial factors as long as it is maintained in the machine and independently of the other card being exchanged in the machine, whereby the combination determining the releasing bar to be operated can be changed while one of the cards is kept in place in the machine.

Still a purpose of the invention is to provide a uniform type of account cards or voucher forms, which can be used for any accounting purpose and which, when selected and marked for a certain accounting purpose, is in a simple way provided with means for automatically actuating the selecting means when being inserted in the machine.

The invention will be described in the following in its application to book-keeping machines, it being understood, however, that it is not restricted to this field of application but has a general application in all machines having totalizers, in which two or more balancing totalizers are to be put into operation simultaneously.

The invention will be more closely described with reference to the accompanying drawings.

The embodiment shown is a further development of the device described in the U. S. patent specification No. 2,277,250 with reference to Figs. 2–14 of said specification and a further development of the device described in the patent application Serial No. 764,740 with reference to Figs. 2–6. The embodiment shown is identical with the embodiments described in said specification and said application in all parts, which according to the following description do not differ therefrom.

Figures 1, 28:
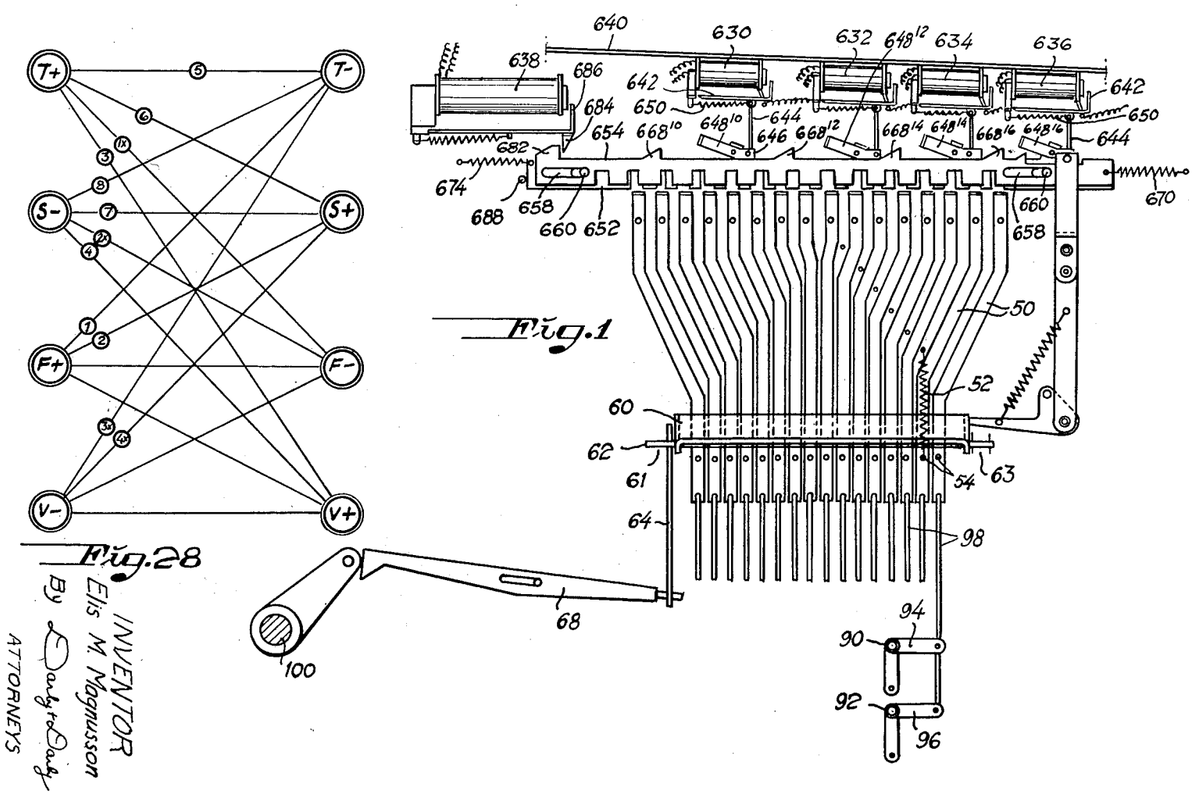
Fig. 1 is a lateral view of the selecting device.
Fig. 28 is a diagram used in illustrating the principles of the device according to the present invention.
Figure 2:
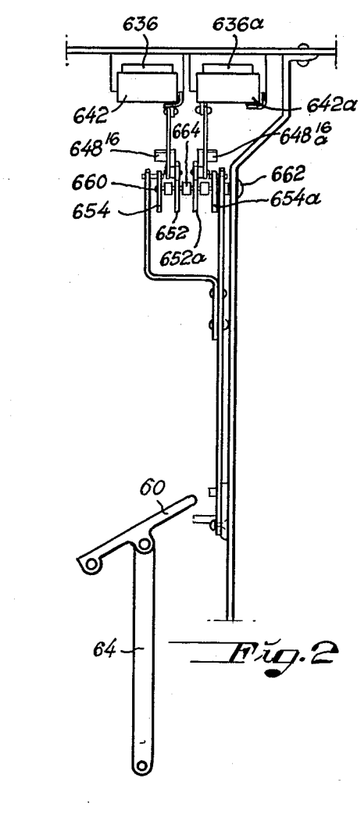
Fig. 2 is a front view of the same device.

Referring to Figs. 1 and 2 the machine comprises two rows of four setting electromagnets 630, 632, 634, 636 of which only the last electromagnet 636 and 636a respectively of each row is visible in Fig. 2. The embodiment shown also comprises a releasing electromagnet 638. These electromagnets, which are provided instead of the setting and releasing keys respectively 510, 512, 514, 516 and 518 shown in Figs. 2 of the above named application Ser. No. 764,740 are placed beneath the key board 640 in locations similar to those of the keys referred to above. Each of the electromagnets 630, 632, 634, 636 has a vertically movable armature 642 pivotally connected with the upper end of a rod 644, the lower end of which is connected with an extension 646 of one of four arms $648^{10}$, $648^{12}$, $648^{14}$, $648^{16}$. Each of the armatures is actioned by a spring 650 which strives to keep the armature in its lower position, and thereby to maintain the corresponding arm in the uplifted position.

Figure 3:
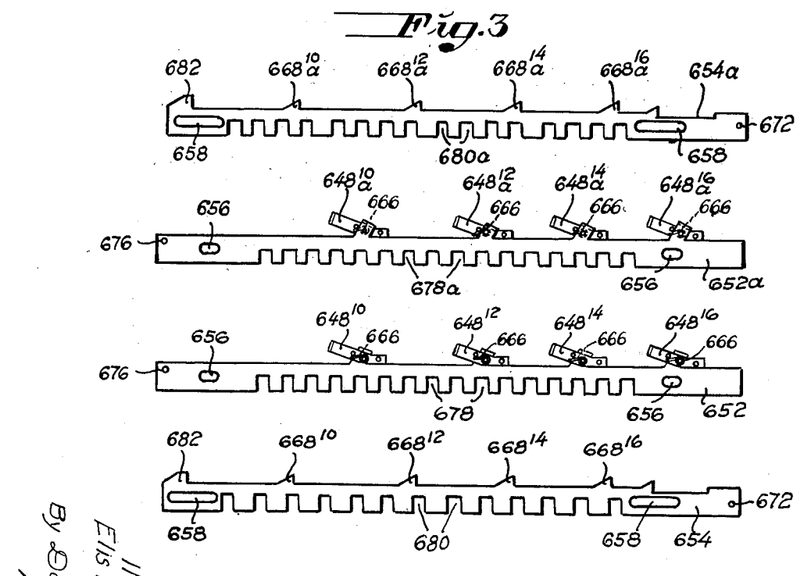
Fig. 3 is a lateral view of the individual catch and lock-bars of the selecting mechanism.

The arms $648^{10}$, $648^{12}$, $648^{14}$, $648^{16}$ connected to the armatures of the electromagnets in each of the two rows thereof are pivotally mounted on one of two inner lock bars 652, 652a disposed parallel to each other and to outer selector bars 654, 654a. These four bars, i. e. the two lock bars 652, 652a and the two selector bars 654, 654a are shown in Fig. 3 separated from each other and turned about a right angle, so that the lowermost selector bar 654 in Fig. 3 is the foremost bar visible in Fig. 1 and the outer left bar seen in Fig. 2. The inner lock bars 652, 652a have relatively short longitudinal slots 656 and the outer selector bars 654, 654a similarly disposed longitudinal slots 658 but of greater length near each end, said slots being engaged by transverse pins 660 slidably supporting said bars so that they are able of longitudinal movement a distance corresponding to the length of the slots. The pins are mounted on a fixed part of the machine at 662 and appropriate spaces are kept between the bars by spacing pieces 664 (see Fig. 2). The arms $648^{10}$ etc., $648^{10}a$ etc. on the inner lock bars are preferably individually actioned by small springs 666 towards their upper positions and have their ends bent outwards over the outer selector bars in alignment with abutments $668^{10}$, $668^{12}$, $668^{14}$, $668^{16}$ and $668^{10}a$, $668^{12}a$, $668^{14}a$, $668^{16}a$ projecting from the upper side of the selector bars 654 and 654a respectively. In the initial position of the lock bars and selector bars the abutments on top of the selector bars are spaced from the outwards bent ends of the corresponding arm $648^{10}$ etc. by a distance which is greatest between the abutment $668^{10}$ and the end of the arm $648^{10}$ (respectively between the abutment $668^{10}a$ and the end of the arm $648^{10}a$) and which decreases towards the right hand end of the bars (as seen in Figs. 1 and 3) to be least between the abutment $668^{16}$ and the end of the arm $648^{16}$ (respectively between the abutment $668^{16}a$ and the end of the arm $648^{16}a$). The outer selector bars 654, 654a are actioned towards the left (as seen in Figs. 1 and 3) by springs 670 engaging a hole 672 in the right hand ends of said bars, the inner lock bars 652, 652a being on the other side actioned towards the left in Figs. 1 and 3 by springs 674 engaging holes 676 in the left hand ends of the lock bars.

Facing the lower edges of the lock bars 652, 652a and selector bars 654, 654a are the horizontally bent ends of a series of sixteen releasing bars 50, each of which is urged upwards by a spring 52 and provided with an abutment pin 54 at its lower end. These sixteen releasing bars 50 are arranged in the same way as the eight releasing bars described in the U. S. patent specification No. 2,277,250 and connected with the totalizers of the machine by transmission means 98, 90, 94, 92, 96 etc., in the manner described and shown (for example in Fig. 3) in the U. S. patent specification No. 2,277,250. The lower edges of the lock bars 652, 652a and selector bars 654, 654a are provided with notches 678, 678a and 680, 680a respectively. The notches 678, 678a of the lock bars 652, 652a are disposed at regular spaces from each other corresponding to the spaces between the centers of the upper ends of the bent upper ends of the releasing bars 50, adapted for cooperation with both lock bars 652, 652a and both selector bars 654, 654a. The outer or selector bars 654, 654a are provided with notches 680, 680a of the same width as the notches of the lock bars 652, 652a, i. e. of a width permitting the upper end of a releasing bar 50 to slide into such a notch, and disposed in the following manner. In the selector bar 654 (the foremost in Fig. 1, the outer left in Fig. 2 and the lowermost in Fig. 3), there are 13 notches 680 equally spaced from each other, the spaces between the centers of two consequent notches being 4/3 of the spaces between the centers of the upper ends of the releasing bars 50. In the selector bar 654a (the hindmost in Fig. 1, the outer right in Fig. 2 and the uppermost in Fig. 3) there are 16 notches 680a in groups of 4, the notches in each group being equally spaced and the distance between the centers of the notches in each group being equal to the distance between the centers of the upper ends of two adjacent releasing bars 50 and the spaces between the centers of the nearest two notches in two consecutive groups being equal to 5/4 of the distance between the centers of the upper ends of two adjacent releasing bars 50.

The outer selector bars 654 and 654a are on the left end of their upper edge provided with a projection 682 and 682a respectively, which cooperate both with a common catch 684 on the movable armature 686 of the releasing electromagnet 638. When the electromagnet 638 is idle, i. e. not energized, the catch 684 engages the projections 682 and maintains the selector bars 654 and 654a in their extreme left position determined by the cooperation of the pins 660 with the right ends of the slots 658 against the action of the springs 670. The inner lock bars 652, 652a are normally maintained by the springs 674 in their left end position determined by the cooperation of the pins 660 with the right ends of the slots 656. This end position may, however, also be determined by an abutment pin 688 cooperating with the outer left ends of the lock bars 652. The distances between the bent ends of the arms 648 and the corresponding projections 668 on the outer selector bars 654, 654a are chosen so as to permit the following functioning of the described device to take place:

Starting from the "normal" position, in which all electromagnets 630, 632, 634, 636 and 638 are idle, the arms $648^{10}$, $648^{12}$, $648^{14}$ and $648^{16}$ being in the uplifted position, the outer selector bars 654, 654a being kept in their left positions by the catch 684 engaging the projection 682 against the action of the springs 670 and the inner lock bars 652, 652a being kept in their left position by the springs 674, as shown in Fig. 1, one of the electromagnets 630, 632, 634 or 636 is energized by a device further to be described. The armature 642 of said electromagnet is then attracted, the corresponding rod 644 drawn upwards and the corresponding arm 648 turned with its free end downwards against the upper edge of the outer selector bar 654. When thereafter one of the electromagnets 630a, 632a, 634a or 636a in the other row of electromagnets (shown to the right in Fig. 2 but not shown in Fig. 1), is energized the same function is performed with respect to the other lock bar 652a, one of its arms being turned to the ready position with its end against the upper edge of the selector bar 654a (see Fig. 2). When thereafter the electromagnet 638 is energized, its armature 686 is attracted, the catch 684, fixed thereto is retracted from its engagement with the projections 682 on the selector bars 654, 654a, which are free to be moved towards the right under the action of the springs 670. During this movement the projection 668 of each selector bar, which is nearest the turned down arm 648 on the corresponding side, hits the bent end of said arm and thus causes the corresponding inner lock bar 652 and 652a respectively to be displaced towards the right against the action of the spring 674, which is of less strength than the spring 670. The lock bars take then both their right end positions determined by the left end of slots 656 contacting the pins 660. In this position of the lock bars 652, 652a, the notches 78 thereof, which in the normal initial position were locking the releasing bars 50 against moving upwards, are now placed in exact prolongation of the bent upper ends of the releasing bars 50 and permit those of them, which are not kept back by the outer selector bars 654, to be urged upwards by their springs 52. Depending on which of the electromagnets 630, 632, 634, 636 and 630a, 632a, 634a, 636a respectively has been energized, i. e. depending on the distance between each of the turned down arms 648 and the corresponding abutment projection 668 on the corresponding selector bar, the foremost selector bar 654 (as seen in Fig. 1) takes a position permitting the upwards motion of one of the four releasing bars in each of four groups of four bars each, while the hindmost selector bar 654a permits the upward motion of all four selector bars in one of said groups of four bars. The hindmost selector bar 654a thus selects the group of four releasing bars 50, in which the releasing bar to be selected is contained, and the foremost selector bar 654 determines which of the releasing bars in said group is to be released. The releasing bar 50 thus selected is urged upwards by its spring 52 and sets the desired totalizers in the position ready for action corresponding to the business transaction to be recorded, essentially as described in the above mentioned U. S. specification No. 2,277,250 and the patent application Serial No. 764,740.

According to a preferred embodiment of the invention those of the electromagnets 630, 630*a*, 632, 632*a*, 634, 634*a* and 636, 636*a* to be energized are selected directly by contact operating means on the accounting cards or vouchers inserted in the corresponding printing devices of the accounting machine, of which the described system for selecting the releasing bars 50 forms a part. These contact operating means may consist of cooperating electrical contact members on the accounting cards or voucher forms inserted and on the platen of the printing device for registering the recorded transaction on said cards or forms. Preferably the electromagnets of the selecting device described above are so arranged, that the four electromagnets in one of the rows (e. g. the foremost in Fig. 1), correspond respectively to an increase of assets, to a decrease of liabilities, to an increase of losses and to a decrease of profits, while the electromagnets in the other row correspond to a decrease of assets, an increase of liabilities, a decrease of losses and respectively to an increase of profits. Fig. 28 diagrammatically illustrates the two rows of electromagnets in two vertical rows of circles designated by the corresponding change in the financial status, "T" designating assets, "S" designating liabilities, "F" designating losses, "V" designating profits, "+" designating increases and "—" designating decreases. In this arrangement of the electromagnets those disposed in one of the rows can be connected to contact members actioned by the card or form inserted in the debit platen of the accounting machine, the electromagnets of the other row being then connected to the contact members actioned by the card or form inserted in the credit platen of the accounting machine. In an embodiment of my invention each of the two accounting cards to be inserted and printed in the accounting machine has one contact member corresponding to assets, liabilities, losses or profits and the electromagnet corresponding to the contact member on the card and situated in the row of electromagnets corresponding to the printing mechanism, in which the card is inserted will be selected and energized. Thus if an account card has a contact operating means corresponding to assets T and is inserted in the debit platen of the accounting machine, the electromagnet T+ in the left row of electromagnets (Fig. 28) will be energized and if an account card having a contact member corresponding to liabilities S is inserted in the credit platen of the accounting machine, the electromagnet S+ in the right row of electromagnets will be energized. Thus the two account cards inserted will automatically cause the energizing of the two electromagnets which in combination with each other will select the releasing bar corresponding to a business transaction representing an increase of assets and an increase of liabilities. The account cards are of course provided with the contact operating means corresponding to the account in question.

The contact operating means on the account cards and the platens of the printing mechanisms of the accounting machine are arranged to connect the corresponding electromagnets with a source of electric current by means of relays. The contact members on the account cards may consist of pieces or strips of conducting material cooperating with contact brushes in the printing platen, of holes or recesses in the card material, the cards being guided between opposed contact members on the platen, or of projections on the cards operating corresponding movable contact members on the platen. Thus the contact operating means on the cards may consist of conductors closing an electric circuit, of discontinuities in the insulating material formed by the card or of pieces of the card material adapted to exert a mechanical action on contact means in the accounting machine.

Figure 4:
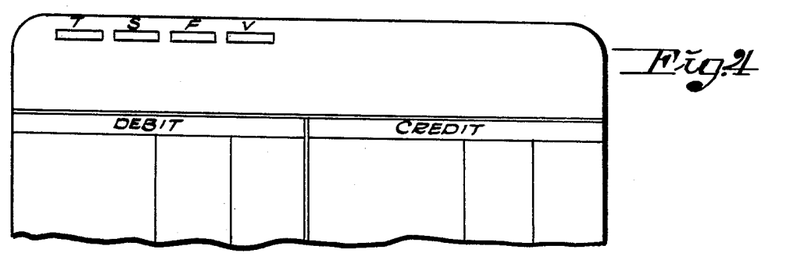
Fig. 4 is a view of the upper part of an account card for use in the device according to the invention.
Figure 5:
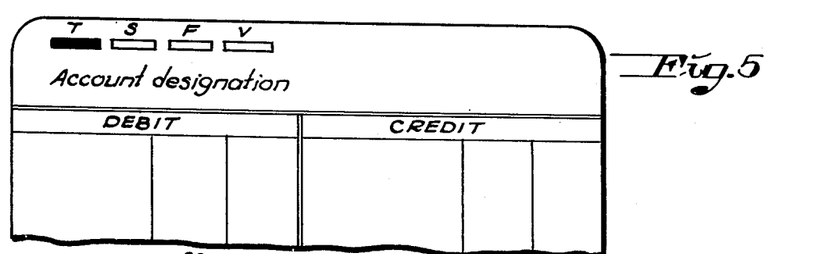
Fig. 5 is a view similar to Fig. 4 of the same card provided with means for automatically operating the selecting mechanism.
Figure 6:
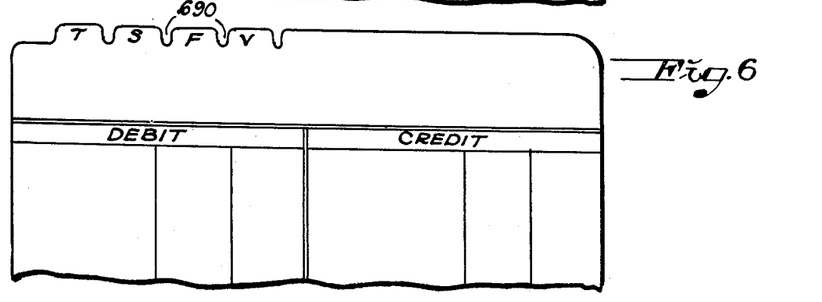
Figs. 6 and 7 are views similar to Figs. 4 and 5 respectively of a second embodiment of account cards.
Figure 7:
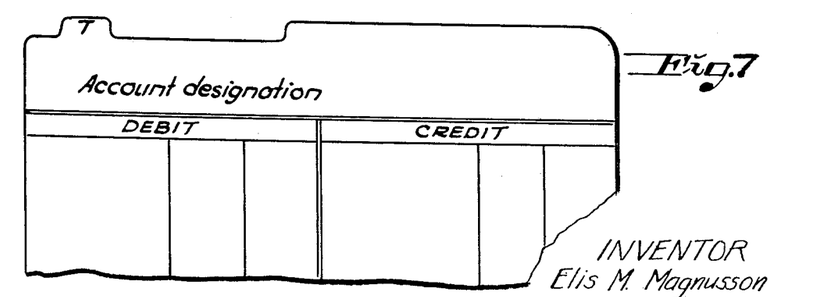
Figure 8:
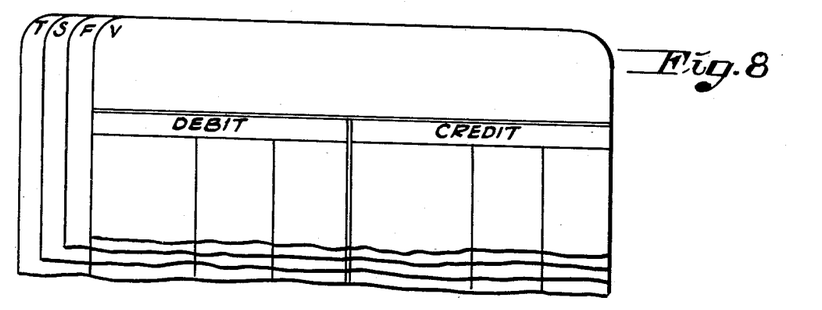
Figs. 8 and 9 are views similar to Figs. 4 and 5 respectively of a third embodiment of account cards.
Figure 9:
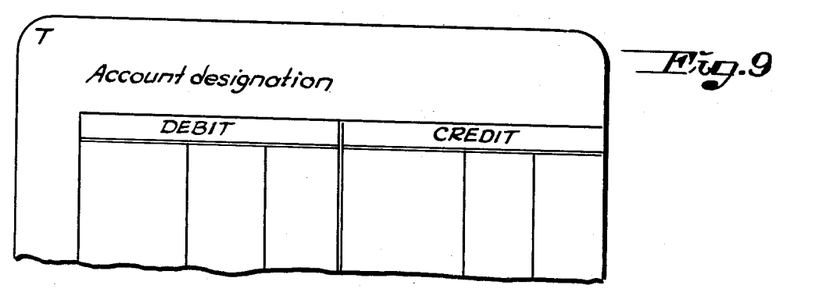
Figure 10:
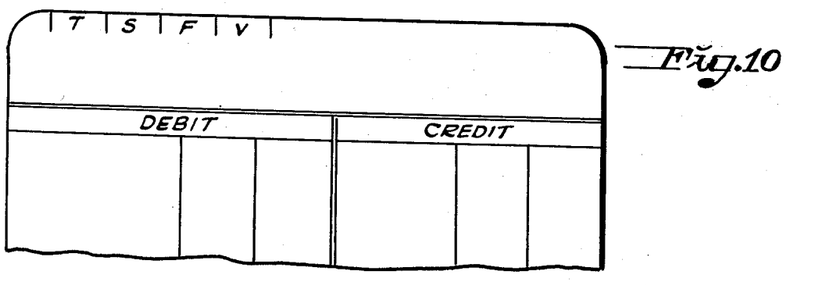
Figs. 10 and 11 are views similar to Figs. 4 and 5 respectively of a fourth embodiment of account cards.
Figure 11:
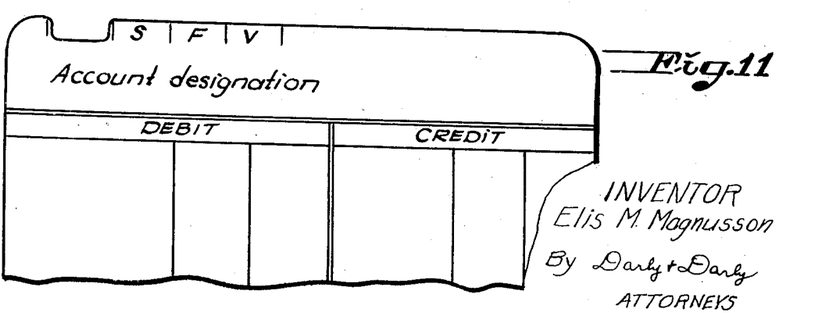
Figure 12:
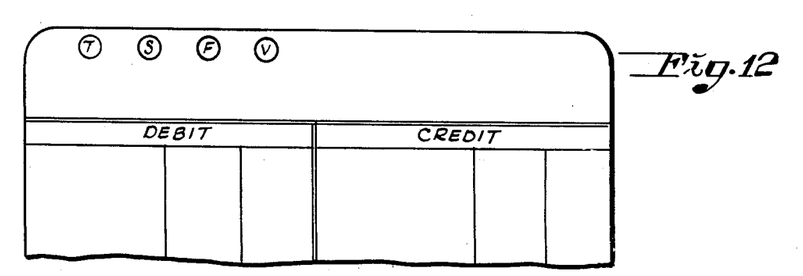
Figs. 12 and 13 are views similar to Figs. 4 and 5 respectively of a fifth embodiment of account cards.
Figure 13:
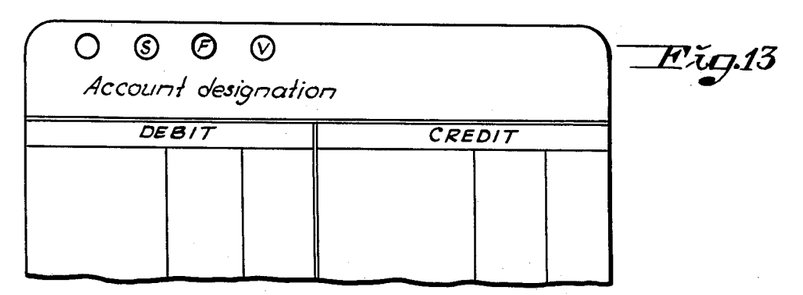

Fig. 4 shows the upper part of a form for an account card provided near its upper edge with four fields T, S, F, V corresponding each to one of the electromagnets in each of the two rows of electromagnets. When the purpose of the account card is determined and its designation written on the head of the card, the field corresponding to the electromagents, which determines the part of the combination represented by the card when placed in one of the printing devices of the machine, in the illustrated case the field T, is covered with a conducting material, e. g. a metal foil glued on the field, a metal clip fixed thereon or even with lead pencil lines. When inserting the card into one of the printing mechanisms of the accounting machine, said conducting material establishes the electric contact between two contacts disposed on the machine in a manner to be described. The contact means on the machine and the connections by which these connect the corresponding electromagnet to a source of electric current are further to be described. Fig. 5 shows the account card of Fig. 4 provided with conducting material on field T and with the Account designation. Fig. 6 shows the upper part of an account form having in its upper edge four incisions 690 separating four flaps T, S, F, V, of which three, e. g. S, F and V are cut away when the purpose of the form is determined and the account designation written on the head of the form. The remaining flap T (Fig. 7) corresponds then to the part of the combination of changes forming the business transaction to be recorded. Instead of providing projections at the upper edge of the account card, these projections can be disposed at one side edge of the card in forms of different width of the form. In this case the forms are preferably manufactured with different width for the different kinds of accounts, Fig. 8 showing four such forms superposed and each designed for which they are to be used. Fig. 9 shows an account form of the type T having the largest width. In order to avoid the manufacturing of different account forms, a single form of the greatest considered width may be manufactured and provided with printed vertical lines, along which the form is cut to reduce it to the necessary width if desired. Instead of cutting off all flaps with the exception of the one designed with the kind of change to be operated, the account form may also be provided with fields at the edge of the card, of which one is cut out to form a recess, as shown in Figs. 10 and 11. Instead of forming such a recess at the edge of the account card, one may also provide fields disposed at a certain distance from the edge and provided for cutting or punching out corresponding holes, as shown in Figs. 12 and 13. In either case the recess or hole may be limited by tearing lines pressed in the card material, so that the corresponding piece can be torn out by hand. Otherwise simple punching devices may be used for cutting out the card material.

When the accounting machine has a special printing device for control printing a bookkeeping order or voucher, the contact members connecting the different electromagnets can be disposed in said third printing device, the vouchers or the like being then provided with means operating said contact members in accordance with the transaction to be registered. The contact members above mentioned in connection with the debit and credit platen of the printing devices for the account cards are then both assembled on the platen of the third printing device preferably each group corresponding to each of the two rows of electromagnets on one side of said printing device. In the examples illustrated the contact means for the debit change are placed on the left side of the platen and voucher form and the contact means for the changed or opposed sign corresponding to the electromagnets of e. g. the right row in Fig. 28 are disposed on the right side of the printing device and voucher form.

Figure 14:
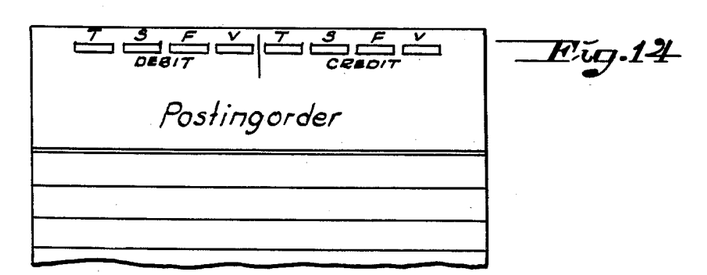
Fig. 14 is a view of an embodiment of voucher form for use in the device according to the present invention.
Figure 15:
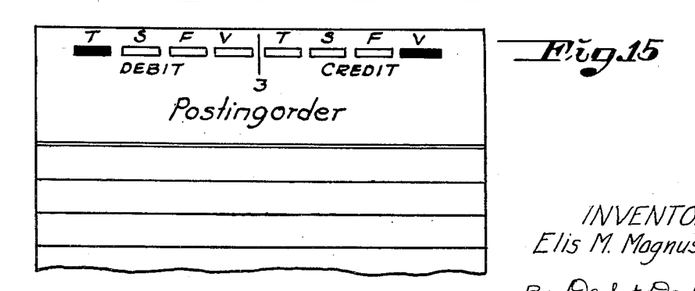
Fig. 15 is a view similar to Fig. 14 of the same voucher form provided with means for automatically operating the selecting mechanism.
Figure 16:
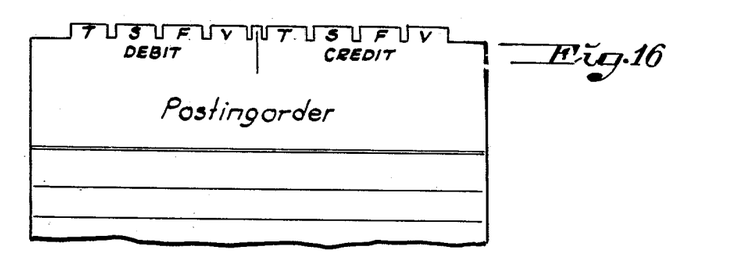
Figs. 16 and 17 are views similar to Figs. 14 and 15 respectively of a second embodiment of voucher form.
Figure 17:
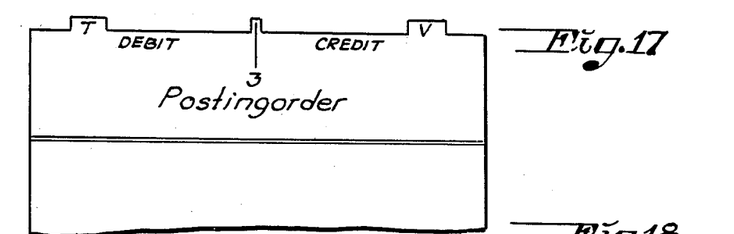
Figure 18:
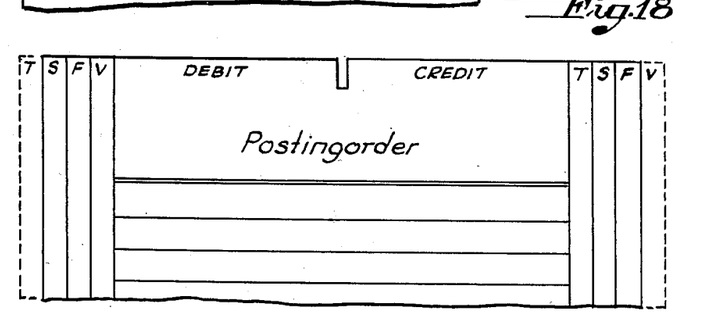
Figs. 18 and 19 are views similar to Figs. 14 and 15 respectively of a third embodiment of voucher forms.
Figure 19:
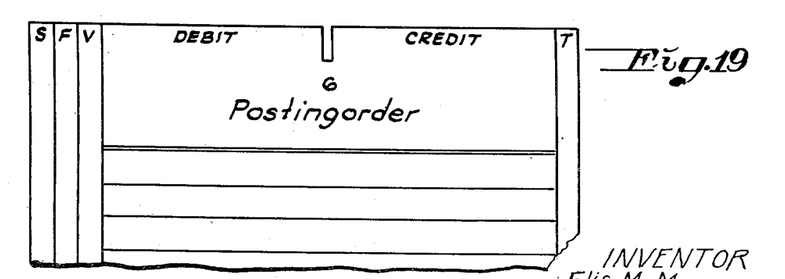
Figure 20:
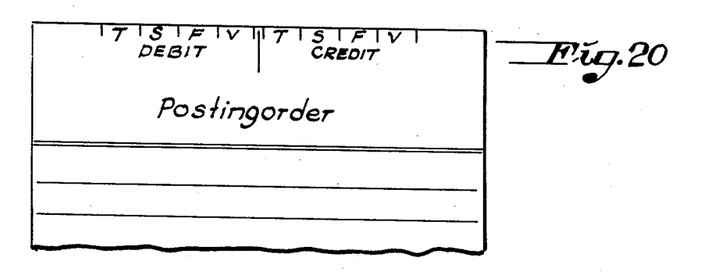
Figs. 20 and 21 are views similar to Figs. 14 and 15 respectively of a fourth embodiment of voucher forms.
Figure 21:
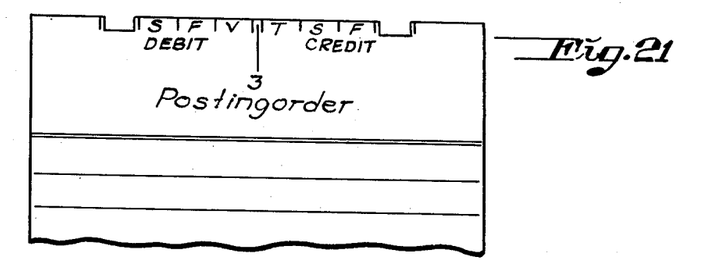
Figure 22:
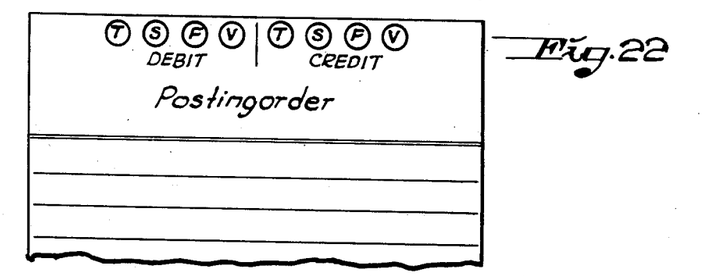
Figs. 22 and 23 are views similar to Figs. 14 and 15 respectively of a fifth embodiment of voucher forms.
Figure 23:
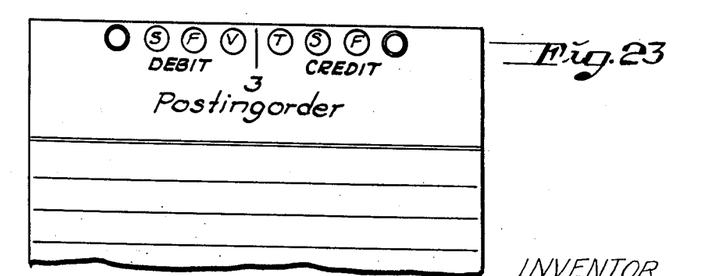

Fig. 14 shows the upper part of a form for posting order, which near its upper edge on each side of a medial line has four fields designed T, S, F, V and adapted to be covered by a conducting material adapted to connect contact members on the platen of the above mentioned third printing device in the accounting machine. Fig. 15 is a corresponding view of the posting order in which the field T on the left side and the field V on the right side of the form have been provided with a conductor, which means, that the voucher when inserted into the printing device, by means of the electric connections to be described, causes the electromagnets T+ in the left row and V+ in the right row of electromagnets to be energized, by which the releasing bar 50 corresponding to the transaction represented by an increase of assets and an increase of profits is selected. The voucher form shown in Fig. 16 is at its upper edge provided with notches separating a number of flaps from each other, four flaps marked T, S, F and V respectively being disposed on each side of the middle of said upper edge. According to the electromagnets to be energized when inserting the voucher into the accounting machine, the flaps are cut off in the same manner as described in connection with the account card form shown in Figs. 6 and 7, only the flaps corresponding to the electromagnets to be energized being left, as shown in Fig. 17. Fig. 18 shows the upper part of a voucher form the two side edges of which are provided with vertical lines limiting vertical strips designed T, S, F and V. According to the transaction to be registered, so much of the side portions of the form is cut off on both sides, that the innermost strip of the cut off portion corresponds to the electromagnet to be energized. Fig. 19 shows such a form representing a transaction corresponding to an increase of assets T+ on the debit side (left side of form) and an increase of liabilities S+ on the credit side (left side of form), for which purpose the outmost strip T of the left side portion and the three outmost strips S, F and V of the right side portion of the form are cut off. A voucher form with portions of its upper edge separated by lines on each side of its medial line and adapted to be cut out in a manner similar to the portions of the upper edge of the account card form illustrated in Figs. 10 and 11 is shown in Fig. 20, Fig. 21 showing the same form with the portion marked T on the left (debit) side and the portion marked V on the right (credit) side cut out and thus made to represent a transaction consisting of an increase of assets on the debit side and an increase of profits on the credit side. Instead of cutting out edge portions of the voucher form, this can be provided with marked fields at a certain distance from the upper edge as shown in Fig. 22, said fields being adapted to be cut, torn or punched to holes in correspondence to the electromagnets to be energized, as shown in Fig. 23, where the outmost field of the two series of fields on each side of the medial line of the form are cut out in order to permit the registration of a transaction consisting in an increase of assets on the debit side and an increase of profits on the credit side.

The account card and voucher forms hereinbefore described represent two different fundamental embodiments of the means on said form for actuating the contact members on the platen of the printing mechanisms of the accounting machine. In the embodiments shown in Figs. 4, 5, 14 and 15 the forms are provided with a conducting material forming a part of the circuit to be closed for actuating the desired electromagnets, while in the second embodiment of such forms shown in Figs. 6 to 13 and 16 to 23 the forms are provided with portions exerting a mechanical action on the contact members in the printing platen.

Figure 24:
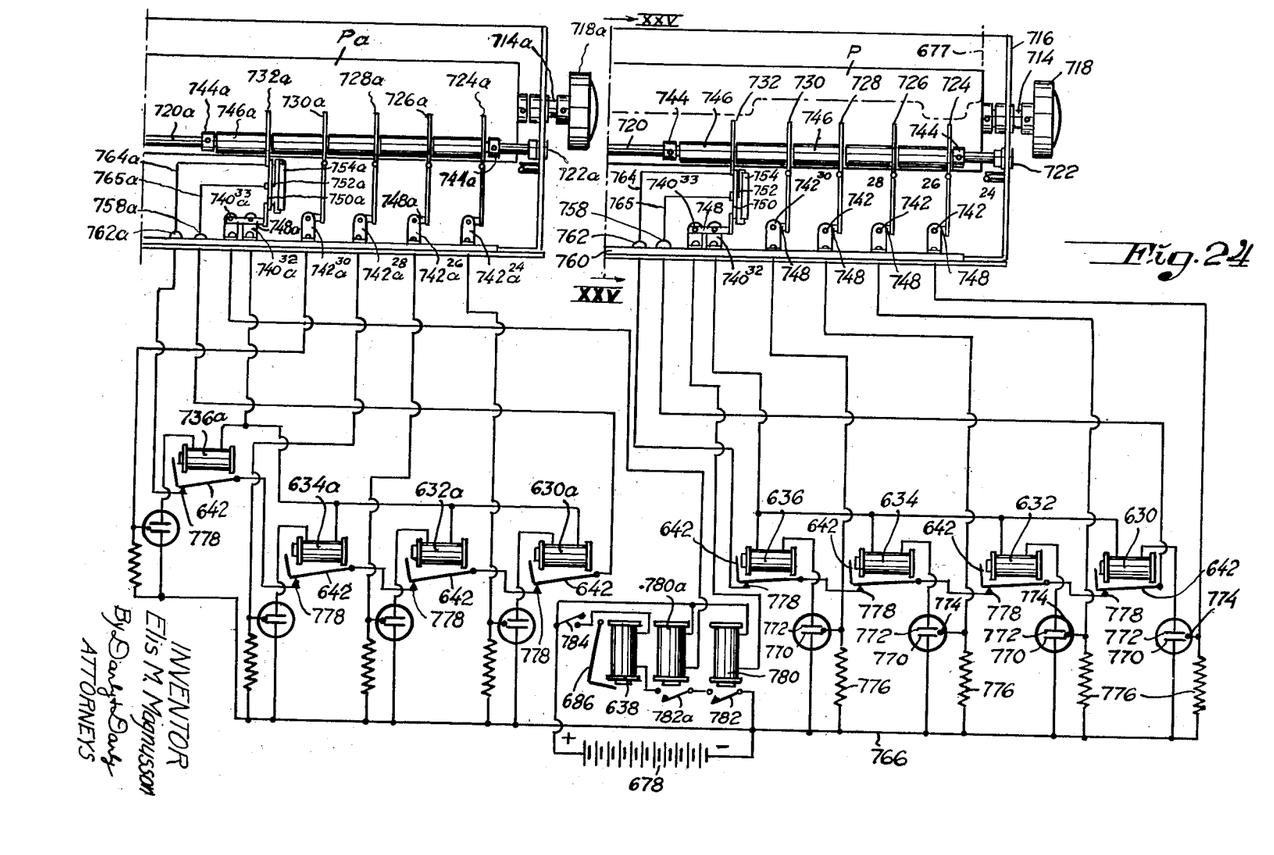
Fig. 24 is a wiring diagram showing the electric connections between contact means on the platens of the printing devices for the account cards or the like and the electromagnets of the selecting mechanism, said platens being shown in rear view.
Figures 25, 27:
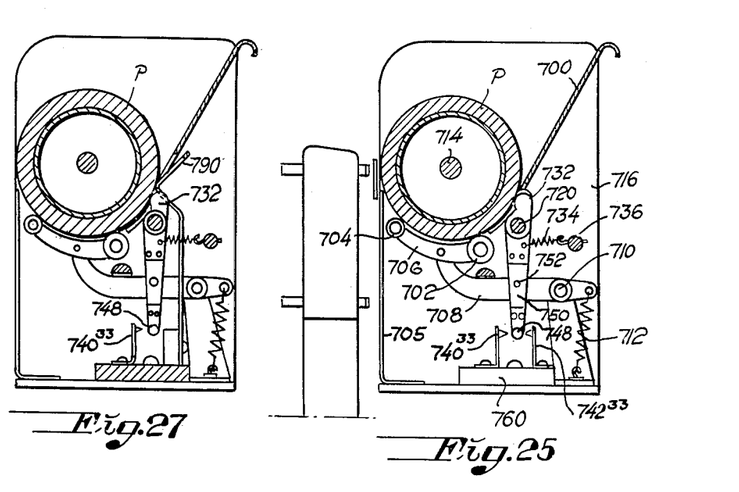
Fig. 25 is a section along line XXV—XXV in Fig. 24 showing the printing types and contact means provided for cooperation with the account cards.
Fig. 27 is a section along line XXVII—XXVII in Fig. 26.

Fig. 24 shows an embodiment of the contact members on the platen of the printing mechanisms on the debit and credit side of the accounting machine seen from the rear of said machine, and a wiring diagram for the connections and relaying means between said contact members and the electromagnets. Fig. 25 is a side view of the contact members of the same embodiment, which is adapted for cooperation with account cards provided with flaps or recesses or holes according to the second of the above mentioned two fundamental embodiments of the means for actuating the contact members.

Figure 26:
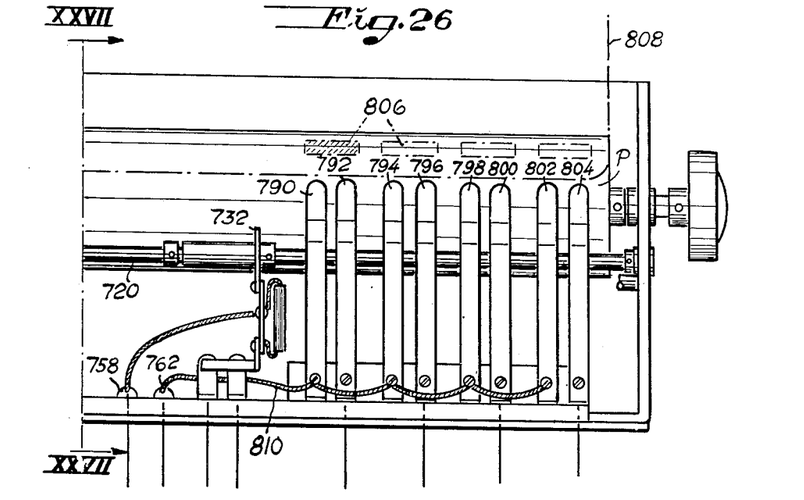
Fig. 26 is a front view of a platen for a printing mechanism with contact means according to another embodiment as the one shown in Fig. 24.

Fig. 24 being a rear view of the debit platen, which ordinarily is positioned in the left part of the machine, is thus shown in the right part of the figure. Referring to Figs. 26 and 27 the device for supporting the account card or like form on the cylindrical platen P consists of a supporting plate 700 (shown only in Fig. 25) on the rear side of the platen P, of resiliently mounted pressure rollers 702 and 704 on the under side of the platen and of a guiding plate 705 on the front side of the platen as generally known in connection with typewriters, calculating machines and the like. In the embodiment shown, the pressure rollers are at their both ends journalled in an arched lever 706, which in its middle portion is tiltably mounted on the end of a lever 708. The latter is journalled on an axle 710 fixedly mounted in the machine and is actioned by a spring 712, which strives to press the pressure rollers 702, 704 against the platen P. The platen cylinder P is with its axle 714 journalled in a fixed support 716 and the end of the axle 714 extending on the outside of the support bears a knob 718 provided for rotating the platen P by hand.

In Fig. 24 the parts 700, 702, 704, 705, 706, 708, 710 and 712 are taken away in order to give a clearer view of the contact means, the contact means being identical for the credit platen P*a* and the debit platen P respectively, they will be described only in connection with the debit platen P. Corresponding parts of the contact means belonging to the credit platen P*a* have been given the same reference numbers added with the letter *a*. Parallel with the platen cylinder P there is a shaft 720 fixedly mounted in the support 716 and electrically insulated from said support by insulators 722. Pivotally mounted on the shaft 720 are five arms 724, 726, 728, 730 and 732 having a shorter lever arm projecting above the shaft and a longer lever arm projecting downwards from the shaft 720. Below the shaft the longer arms are connected each to one end of a spring 734 (shown only in Fig. 25), the other end of which is hinged on a fixed rod 736 mounted between the support members 716 at both ends of the platen only the outer ends of the rod being shown in Fig. 24. The upper end of the arms 724—732 is thus urged against the platen cylinder P by the spring 734 and a pin 748 fixed at the lower end of each arm is thus urged towards one 742 of two contacts placed on either side of the pin 748, the other contact 740 being contacted by the pin 748 when the arm is brought to swing around the shaft 720 against the action of the spring 734. The arms 724—732, are kept in their place on the shaft 720 by stop rings 744 and distance tubes 746 between the arms, which are in electric contact with the shaft but freely rotatably mounted on it. In Fig. 24 the contacts 742 only are shown, and to differentiate them the contact cooperating with the arm 724 is designed $742^{24}$, the one cooperating with the arm 726 by $742^{26}$, the one cooperating with arm 728 by $742^{28}$, and the one cooperating with arm 730 by $742^{30}$. The pin 748 at the lower end of arm 732 is longer than the pins on the other arms and cooperates with two contacts $740^{32}$, $740^{33}$ when the arm is turned in the clockwise direction as seen in Fig. 25. The four outer arms 724, 726, 728 and 730 are located relatively to the platen P and to each other so as to cooperate each with one of the flaps, recesses, holes or the like of the account cards inserted in the printing mechanism between the platen P and the guiding plate 700 and pressure rollers 702 and 704, these four outer arms are made of plain sheet metal, so that the pin 748 is electrically connected with the shaft 720. The fifth arm 732 has the middle portion of its lower lever arm formed by a plate 750 of insulating material, so that the pin 748 on the lower end of the arm is electrically insulated from the shaft 720. The insulating plate 750 has in its middle a connecting member 752 connected to one end of a high resistance bar 754, the other end of which is connected to the lower metal end of arm 732 and by this with the pin 748. The connecting member 752 is also by a flexible conductor 756 connected with a connection screw 758 on the insulating base plate 760 of the contacts 742. A second connection screw 762 is by a flexible conductor 764 connected with the upper conducting part of arm 732 and thus with the shaft 720. The arm 732 is located in a position relatively to the platen cylinder and the other arms, where its upper end urged against the platen cylinder P by the spring 734 cooperates with the plain portion of the upper edge of the account card inserted in its place. When an account card with flaps of the type shown in Figs. 6 and 7 is inserted between the guiding plate 700 and the platen cylinder P and the latter is turned to feed the card into position for printing, the card passes a position, in which the flap left on the card lifts the upper end of arm 724 while the plain upper edge of the card, which is inserted upside down between the guiding plate 700 and the platen P lifts the upper end of arm 732. The pin 738 on arm 724 and the pin 748 on arm 732 are thereby brought in contact with the contact members $740^{24}$ and $740^{32}$, $740^{33}$ respectively. When using account cards with flaps as has been admitted above, the contact members $740^{24}$, $740^{26}$, $740^{28}$, $740^{30}$ are connected to the electric circuit of the electromagnet in the manner described below, but if cards with notches instead of flaps are used, the contact members $742^{24}$, $742^{26}$, $742^{28}$ and $742^{30}$ are used for the connection of the circuits. As a principle, the flaps, notches, holes or the like on the account cards are adapted to close a corresponding contact when the flap, notch or hole passes the corresponding arm, and the arm 732 always is turned to close contacts $740^{32}$ and $740^{33}$ when lifted by the plain edge of the card. According to the kind of card used, the contacts $740^{24}$, $740^{26}$ etc. or the contacts $742^{24}$, $742^{26}$ etc. are used to obtain the desired closing of contacts. Evidently, when the card is turned in between the platen P and the upper ends of the contacting arms, all the contacts connected will be closed, but the circuits are coupled so as to energize the electromagnets desired only under the action of the contact arms at a determined position of the account card when this is inserted in the machine. The connections of the circuits and their function will now be described with reference to the wiring diagram shown in Fig. 24.

A minus or earth line 766 is connected to the minus pole of a battery 768 and to one 770 of the electrodes of eight grid glow discharge tubes, the other electrode 772 of which is connected to one end of the winding of each of the electromagnets 630, 632, 634, 636, 630*a*, 632*a*, 634*a* and 636*a* respectively. The other ends of the windings of the electromagnets 630, 632, 634 and 636 are connected together to the contact $740^{32}$ belonging to the debit platen, and the other ends of the windings of the electromagnets 630*a*, 632*a*, 634*a* and 636*a* are connected together to the contact $740^{32}a$ belonging to the credit platen. The grids 774 of the grid glow discharge tubes are each connected to the earth line 766 through a resistance 776 and to one of the contacts 742 of the corresponding platen in such manner, that the grid of the tube, the electrode 772 of which is connected with the electromagnet 630, is connected to the contact $742^{24}$, the grid of the tube connected to electromagnet 632 to contact $742^{26}$, the grid of the tube connected to electromagnet 634 to contact $742^{28}$, the grid of the tube connected to electromagnet 636 to contact $742^{30}$, the grid of the tube connected to electromagnet 630*a* to contact $742^{24}a$, the grid of the tube connected to electromagnet 632*a* to contact $742^{26}a$, the grid of the tube connected to electromagnet 634*a* to contact $742^{28}a$ and the grid of the tube connected to electromagnet 636*a* to contact $742^{30}a$. The contacts $742^{24}$ etc. on the debit and credit platen are of course only used when the machine is to be used with cards provided with flaps. If cards with notches or holes are to be used, the corresponding contacts $742^{24}$ etc. are connected with the respective grids in the tubes connected with the corresponding electromagnets. Generally the grids are connected to those of the contacts in the platens, which are closed at the passage of the portion of the account card provided to select the electromagnet to be energized. Therefore, in the following description, the mention of any of the contacts $742^{24}$—$742^{30}$ and $742^{24}a$—$742^{30}a$ refers to the connections made when using cards with flaps, the corresponding contacts $740^{24}$—$740^{30}$ and $740^{24}a$—$740^{30}a$ respectively being meant when using cards with notches or holes.

The armatures 642 of the electromagnets 630, 630a to 636, 636a are adapted to rest each upon a contact 778. The armature 642 of electromagnet 630 is connected to the connection screw 758 and the contact 778 cooperating with this armature is connected to the armature of electromagnet 632, which in its turn by its cooperating contact 778 is connected to the armature of electromagnet 634. This is connected in the same manner by contact 778 to the armature of electromagnet 636, the cooperating contact of which is connected to the other connection screw 762. When all the armatures of the electromagnets in one series of four electromagnets e. g. 630—636 belonging to the same row are in the idle position, the connection screws 758 and 762 are connected with each other in series through the four armatures of the electromagnets in question. The same arrangement is made with respect to the electromagnets 630a—636a and to the connection screws 758a and 762a. Contacts $740^{33}$ and $740^{33}a$ are connected each through the winding of an electromagnet 780 and 780a respectively to the plus pole of the battery 678, each of these electromagnets actioning a switch 782 and 782a respectively so that said switch is closed when the electromagnet is energized. The switches 782 and 782a, the winding of the releasing electromagnet 638 and a releasing switch 784 are connected in series between the 0-line 766 and the plus pole of the battery 678. The grid glow discharge tubes and the electric tension between the poles of the battery 678 are chosen so that when the electrodes 772 receive the same potential as the plus pole of the battery, the electrodes 770 being connected to the minus pole, the tubes do not begin to glow, but that when the grid 774 of a tube is put under a certain tension, the tube begins to glow, permitting current to pass between the electrodes 772, 770 and that the tube continues to glow even after the grid 774 has ceased to be under tension.

The function of the means just described, by which the electromagnets controlling the action of the stop and selector bars are energized in dependency of the flaps, notches or holes in the account cards, is the following: When inserting an account card in the debit platen P, arm 732 is first actioned by the plain forward edge of the card and its pin 748 connects the contacts $740^{32}$ and $740^{33}$ with each other, whereby the positive electrodes 772 of all four grid glow discharge tubes belonging to the electromagnets 630, 632, 634 and 636 controlled from the debit platen receive the potential of the plus pole of the battery 678 through the winding of electromagnet 780, contact $740^{33}$, pin 748, contact $740^{32}$ and the windings of the aforesaid four electromagnets 630—636. As there is no current passing through the tubes, the electromagnets 630—636 and 780 are not energized. Simultaneously with arm 732 or shortly afterwards (depending on the form and location of the flaps, notches or holes in the card) one of the arms 724, 726, 728 or 730 is actioned and the pin 738 on said arm brought against the corresponding contact $742^{24}$, $742^{26}$, $742^{28}$ or $742^{30}$ respectively, whereby said contact is connected to the shaft 720. Taking that the arm 724 is actioned by the flap of the card shown by the mixed line 677 in Fig. 24, the contact $742^{24}$ will be connected to the plus pole of the battery 678 through the pin 748, the arm 724, the shaft 720, the upper portion of arm 732, the flexible conductor 764, connecting screw 762, the contacts 778 and the armatures of the four electromagnets 630—636 in series after each other, the contact screw 758, the flexible conductor 765, the resistance 754, pin 748, contact $740^{33}$ and the winding of electromagnet 780. The grid 774 of the glow discharge tube belonging to electromagnet 630 thereby receives a tension impulse, which starts the glowing of the tube and thus the passage of current through the winding of electromagnet 630, contact $740^{32}$, pin 748, contact $740^{33}$ and the winding of electromagnet 780. These two electromagnets are thereby energized, electromagnet 630 (Fig. 1) turning the arm $648^{10}$ down to the position ready for cooperation with the abutment $668^{10}$.

The electromagnet 780, which is also energized, causes the switch 782 to be closed. The tube, which has been brought to glow, will continue to glow even after the arm 724 has been turned away from the corresponding contact $742^{24}$ after the passage of the corresponding flap (notch, hole) in the account card, and is kept glowing as long as the card remains inserted in the platen, i. e. as long as the arm 732 is kept in position with the pin 748 against contacts $740^{32}$ and $740^{33}$. When the pins 748 of the arms 726, 728 and 730 are brought to bear against contacts $742^{26}$, $742^{28}$ and $742^{30}$ respectively, by the edge of the body of the card, the closing of said contacts has no effect, the circuit between the connecting screw 758 and 762 being broken by the attraction of the armature of the electromagnet 630 and the separation of contact 778 from said armature. Thereby the energizing of more than one selecting electromagnet in one row of four electromagnets is made impossible. The connections and devices in the left part of Fig. 26, i. e. in the portion of the device connected to the credit platen of the machine, being identical with the device just described, its function will also be the same. Thus when an account card is inserted in the credit platen Pa and the electromagnet corresponding to the marking of the card is energized, the electromagnet 780a will be simultaneously energized, the corresponding switch 782a closed and the circuit through the releasing electromagnet 638 thus made ready to be connected over the poles of the battery 678 by closing the releasing switch 784. Thus the operator has only to insert the desired account cards into the machine on the credit and debit platens respectively, to set the amount of the transaction on the ordinary setting keys and to press the starting switch to obtain a correct recording of the transaction on the account cards and in the totalizers within the machine.

The contact members on the platens for the account cards may also as previously mentioned be disposed on the platen for control-printing the voucher, which for this purpose is provided with flaps, notches, holes or the like as described in connection with Figs. 14–23. In this case the contact means described above are arranged on both sides of the middle of the printing platen for said vouchers or the like.

When the account cards of vouchers are provided with fields, of which those intended to actuate the electromagnets are covered with conducting material, the contact means are somewhat different, as illustrated in Figs. 26 and 27, all parts not mentioned in connection with these figures being identical with those described in connection with Figs. 24 and 25 and having the same reference numbers as those previously used. In this embodiment the arms 724—730 previously described are substituted by a pair of lamel spring contacts 790 and 792, 794 and 796, 798 and 800, 802 and 804 respectively, the contacts of each pair being disposed within the path of one of the fields 806 on the card 808 when this is inserted into the platen P. One contact lamel in each pair, i. e. the lamels 790, 794, 798 and 802 are connected with each other and with the connecting screw 762 by a conductor 810 in the same manner as the arms 724—730 in Fig. 26 are connected through the shaft 720 and the conductor 764 with the connecting screw 762. The other lamels in each pair, i. e. lamels 792, 796, 800 and 804 are each connected directly with the grid in one of the glow discharge tubes and thus are connected correspondingly to the contacts 742 in Fig. 26. When the card is inserted in the platen, the plain edge of the card reaches the upper end of arm 732 slightly before the fields reach the portion of the lamels urged against the platen P by the spring action of the lamels themselves, so that the contact between pin 748 and the contacts 740$^{32}$ and 740$^{33}$ is closed before the two lamels 790 and 792 of the pair facing the field 806 covered with conducting material are connected with each other by said conducting material. It will readily be understood, that the passage of the field 806 provided with conducting material thus will connect the connecting screw 762 with one of the lamels 792, 796, 800 or 804 in the same manner, as the passage of a flap, notch or hole in a card in the embodiment heretofore described will connect the connecting screw with one of the contacts 742$^{24}$, 742$^{26}$, 742$^{28}$ or 742$^{30}$. The function of the device will therefore be exactly as previously described. The conducting material on one of the fields 806 having only to transmit a feeble tension impulse necessary to start the glowing of one of the glow discharge tubes, the electrodes of which are already brought under tension by the action of arm 732, the conducting material need not permit the passage of any important amount of current and may therefore present a relatively high resistance. The covering of the field in question with lead pencil lines has been found to be sufficient for the transmission of the necessary tension to the grid of the grid glow discharge tube to be started. There is no risk for another glow discharge tube to be started by any pencil line below any other of the fields, the disconnection of the circuit through the armatures 642 and contacts 778 at the first connection between two lamels rendering the energizing of any further electromagnet impossible, as previously described in connection with Fig. 24.

It is to be observed, that the invention is in no way limited to the embodiments described and shown in detail, but that modifications may be made without departing from the principle of the invention set forth in the appending claims.

What I claim is:

1. In a book-keeping machine, comprising a plurality of totalizers, selector means selectively to put combinations of at least two totalizers into operation simultaneously, each selector means corresponding to a fixed combination of totalizers different from the others, electrically operated means operating said selector means, each by operating a determined combination of two actuating means, printing mechanisms for registering the book-keeping operation performed on accounting forms inserted into said printing mechanisms, contact means on one or more of said printing mechanisms connected with said electrically operated actuating means and a source of electric current, contact operating means on said accounting forms distinctive for different accounting purposes of said forms and for actuating by means of said connecting means one of the combinations of two actuating means automatically to select the combination of totalizers and their sense of actuation determined by the accounting purpose of the form or forms inserted into the printing mechanism or mechanisms.

2. In a book-keeping machine, comprising a plurality of totalizers, selector means selectively to put combinations of at least two totalizers into operation simultaneously, each selector means corresponding to a fixed combination of totalizers different from the others, two or more printing mechanisms for registering the book-keeping operation performed on accounting forms inserted into said printing mechanism, contact means on one or more of said printing mechanisms connected with one electromagnet and a source of electric current, a system of racks operated by said electromagnets and adapted for selecting the selector means corresponding to the combination of totalizers corresponding to the business transaction to be performed, contact operating means on said accounting forms distinctive for different accounting purposes of said forms and for releasing by means of said contact means and the corresponding electromagnets the selector means corresponding to the combination of totalizers to be operated.

3. In a book-keeping machine, comprising a plurality of totalizers, selector means selectively to put combinations of at least two totalizers into operation simultaneously, each selector means corresponding to a fixed combination of totalizers different from the others, two or more printing mechanisms for registering the book-keeping operation performed each on an accounting form corresponding to one aspect of the transaction registered, two contact operating means on one or two of said forms, each contact operating means cooperating with one of two groups of contact means selectively to connect each an electromagnet in one of two corresponding groups of electromagnets to a source of electric current, each of the two energized electromagnets determining the position of one of two selecting racks determining by combination the selector means corresponding to the type of business transaction determined by the contact operating means on the account cards.

4. In a book-keeping machine, comprising a plurality of totalizers, selector means selectively to put combinations of at least two totalizers into operation simultaneously, each selector means corresponding to a fixed combination of totalizers different from the others, two or more printing mechanisms for registering the book-keeping operation performed each on one of a number of accounting forms corresponding to the number of printing mechanisms, one of said printing mechanisms registering a credit operation on a credit account form and another of said printing mechanisms registering a debit operation on a debit account form, each of said account forms having contact operating means cooperating with one of four contact means in each printing mechanism, each contact means in the said credit printing mechanism being connected to one of four electromagnets in a first group of electromagnets and each contact means in the said debit printing mechanism being connected to one of four electromagnets in a second group of electromagnets, the electromagnets of said first group determining each a determined position of a selecting bar attached to said first group and the electromagnets of said second group determining each a determined position of a selecting bar attached to said second group, each of the selector means for putting combinations of totalizers into operation cooperating with both selecting bars, said bars having rows of notches adapted in each combination of positions of the two selecting bars determined by the electromagnets to permit one of said selector means to move into said notches and thereby to determine the desired combination of totalizers to be operated.

5. In a book-keeping machine as claimed under 4, contact operating means on the account forms formed by strips of conducting material applied on the account cards in a location distinctive for the accounting purpose of the form and corresponding to the contact means to be operated on the corresponding printing mechanism.

6. In a book-keeping machine as claimed under 4, contact operating means on the account forms formed by portions of the form adapted to exert mechanical action on the contact means and having a form and location distinctive for the accounting purpose of the form and corresponding to the contact means to be operated on the corresponding printing mechanism.

7. In a book-keeping machine as claimed under 6, the portion of the forms adapted to exert mechanical action on the contact means having the form of a projection at one edge of the form, said projection actioning contact members to close the energizing circuit of the corresponding electromagnet at the passage of said projection past said contact members in the printing mechanism.

8. In a book-keeping machine, comprising a plurality of totalizers, selector means selectively to put combinations of at least two totalizers into operation simultaneously, each selector means corresponding to a fixed combination of totalizers different from the others, two or more printing mechanisms for registering the book-keeping operation performed each on one of a number of accounting forms corresponding to the number of printing mechanisms, one of said printing mechanisms registering a credit operation on a credit account form and another of said printing mechanisms registering a debit operation on a debit account form, each of said account forms having contact operating means cooperating with one of four contact means in each printing mechanism, each contact means in the said credit printing mechanism being connected to one of four electromagnets in a first group of electromagnets and each contact means in the said debit printing mechanism being connected to one of four electromagnets in a second group of electromagnets, the electromagnets of said first group determining each a determined position of a selecting bar attached to said first group and the electromagnets of said second group determining each a determined position of a selecting bar attached to said second group, each of the selector means for putting combinations of totalizers into operation cooperating with both selecting bars, said bars having rows of notches adapted in each combination of positions of the two selecting bars determined by the electromagnets to permit one of said selector means to move into said notches and thereby to determine the desired combination of totalizers to be operated, contact operating means on the account forms formed by portions of the form adapted to exert mechanical action on the contact means, said portions having the form of a cut out area of the form, said cut out area actioning contact members to close the energizing circuit of the corresponding electromagnet at the passage of said cut out area past said contact members in the printing mechanism.

9. In a book-keeping machine as claimed under 4, contact control means operated by any form inserted in a printing mechanism, said contact control means establishing operable connection of the contact members when said contact members are within operating range of the contact operating means on the form inserted into the printing mechanism.

10. In a book-keeping machine, comprising a plurality of totalizers, selector means selectively to put combinations of at least two totalizers into operation simultaneously, each selector means corresponding to a fixed combination of totalizers different from each other, two or more printing mechanisms for registering the book-keeping operation performed each on one of a number of accounting forms corresponding to the number of printing mechanisms, one of said printing mechanisms effecting a control registration of the book-keeping operation performed on a book-keeping order or voucher having two contact operating means cooperating each with one contact member in one of two groups of four contact means each and corresponding each to one of the two aspects of the book-keeping operation determining in combination the combination of totalizers to be operated, each contact means in each group of contact means being connected to one of four electromagnets in one of two groups of electromagnets, the electromagnets of one of said groups determining each a determined position of a selecting bar attached to said group and the electromagnets of the other of said groups determining each a determined position of a selecting bar attached to said other group, each of the selector means for putting combinations of totalizers into operation cooperating with both selecting bars, said bars having rows of notches adapted in each combination of positions of the two selecting bars determined by the electromagnets to permit one of said selector means to move into said notches and thereby to determine the desired combination of totalizers to be operated.

11. In a book-keeping machine as claimed under 10, contact operating means on the book-keeping order or voucher form formed by strips of conducting material applied on the form in locations distinctive for the contact means to be actuated in each group of contact means.

12. In a book-keeping machine as claimed under 10, contact operating means on the book-keeping order or voucher form formed by portions of the form adapted to exert mechanical action on the contact means and having a form and location distinctive for the contact means to be actuated in each group of contact means.

13. In a book-keeping machine as claimed under 12, the portions of the form adapted to exert mechanical action on the contact means having the form of projections at one edge of the form, said projections actioning contact members to close the energizing circuit of the corresponding electromagnets at the passage of said projections past said contact members in the printing mechanism.

14. In a book-keeping machine, comprising a plurality of totalizers, selector means selectively to put combinations of at least two totalizers into operation simultaneously, each selector means corresponding to a fixed combination of totalizers different from each other, two or more printing mechanisms for registering the book-keeping operation performed each on one of a number of accounting forms corresponding to the number of printing mechanisms, one of said printing mechanisms effecting a control registration of the book-keeping operation performed on a book-keeping order or voucher having two contact operating means cooperating each with one contact member in one of two groups of four contact means each and corresponding each to one of the two aspects of the book-keeping operation determining in combination the combination of totalizers to be operated, each contact means in each group of contact means being connected to one of four electromagnets in one of two groups of electromagnets, the electromagnets of one of said groups determining each a determined position of a selecting bar attached to said group and the electromagnets of the other of said groups determining each a determined position of a selecting bar attached to said other group, each of the selector means for putting combinations of totalizers into operation cooperating with both selecting bars, said bars having rows of notches adapted in each combination of positions of the two selecting bars determined by the electromagnets to permit one of said selector means to move into said notches and thereby to determine the desired combination of totalizers to be operated, contact operating means on the book-keping order or voucher form formed by portions of the form adapted to exert mechanical action on the contact means, said portions having the form of cut out areas of the form, said cut out areas actioning contact members to close the energizing circuit of the corresponding electromagnets at the passage of one of said cut out areas past said contact members in the printing mechanism.

15. In a book-keeping machine as claimed under 10, contact control means operated by any book-keeping order or voucher form inserted in the control printing mechanism, said contact control means establishing operable connection of the contact members when said contact members are within operating range of the contact operating means on the form inserted into said control printing mechanism.

16. In a book-keeping machine, comprising a plurality of totalizers, selector means selectively to put combinations of at least two totalizers into operation simultaneously, each selector means corresponding to a fixed combination of totalizers different from the others, two or more printing mechanisms for registering the book-keeping operation performed on accounting forms inserted into said printing mechanisms, each printing mechanism comprising a platen cylinder supporting the accounting form, a number of arms corresponding to the number of electromagnets attached to said printing mechanism journalled between their ends and actuated by springs to urge one end of said arms against the platen cylinder, the other end of said arms bearing a contact member adapted for cooperation with at least one fixed contact to close a circuit for the energization of the corresponding electromagnet when the arm is tilted by a contact operating means on the form inserted into the printing mechanism, a system of racks operated by said electromagnets and adapted for selecting the selector means corresponding to the combination of totalizers corresponding to the business transaction to be performed, said contact operating means on said accounting forms being distinctive for different accounting purposes of said forms and for releasing by means of said contact means and the corresponding electromagnets the selector means corresponding to the combination of totalizers to be operated.

17. In a book-keeping machine as claimed under 16, a contact arm in the printing mechanism actioned by a portion of the form outside the contact operating means independently of the form and location of the contact operating means at the passage of the form past said arm to close a contact between the contact arms operated by the contact operating means on the forms and the part of the energizing circuit of the electromagnets connected thereto at the moment of the passage of the form past the contact arms when the electromagnet selected is to be energized.

18. In a book-keeping machine comprising a plurality of totalizers, selector means selectively to put combinations of at least two totalizers into operation simultaneously, each selector means corresponding to a fixed combination of totalizers different from the others, two or more printing mechanisms for registering the book-keeping operation performed each on an accounting form corresponding to one aspect of the transaction registered, two contact operating means on one or two of said forms, each contact operating means interposed in the energizing circuit of a selecting electromagnet in one of two corresponding groups of electromagnets, the armatures of said electromagnets cooperating with contacts connected in series and opened at the energization of the electromagnet to prevent the energization of more than one electromagnet at a time in each group, each of the two energized electromagnets determining the position of one of two selecting racks, determining by combination the selector means corresponding to the type of business transaction determined by the contact operating means on the account cards.

19. A book-keeping machine as claimed under 18, in which the one end of the winding of each selecting electromagnet is connected to one electrode of a grid glow discharge tube, the other electrode of which is connected to one pole of a source of electric current, the other end of said winding being connected to the other pole of the source of electric current through a contact on the platen operated by any form inserted in the platen and through the winding of one of two electromagnetic relays, one for each group of contact means on the platen or platens, said relays operating contacts connected in series with each other and with the source of electric current through the winding of an operating electromagnet and an operating contact provided for starting the registering operation, the contact means on the platens operated by the contact operating means on the forms being connected each to the grid of the grid glow discharge tube connected to the corresponding selector electromagnet and through a resistance to the pole of the source of electric current to which the electrodes opposed to those connected with the selector electromagnet windings are connected.

ELIS MAGNUS MAGNUSSON.

REFERENCES CITED

The following references are of record in the file of this patent:

UNITED STATES PATENTS

| Number | Name | Date |
|---|---|---|
| 1,753,991 | Langford | Apr. 8, 1930 |
| 1,930,252 | Reynolds | Oct. 10, 1933 |
| 2,057,606 | Campos | Oct. 13, 1936 |
| 2,222,373 | Rauh | Nov. 19, 1940 |
| 2,240,667 | Paris | May 6, 1941 |
| 2,277,250 | Nyberg | Mar. 24, 1942 |
| 2,442,970 | Carroll et al. | June 8, 1948 |

FOREIGN PATENTS

| Number | Country | Date |
|---|---|---|
| 883,135 | France | Mar. 15, 1943 |